United States Patent

Nakamura et al.

[11] Patent Number: 5,540,859
[45] Date of Patent: Jul. 30, 1996

[54] PHOSPHOR, RADIATION IMAGE RECORDING AND REPRODUCING METHOD AND RADIATION IMAGE STORAGE PANEL EMPLOYING THE SAME

[75] Inventors: Takashi Nakamura; Kenji Takahashi, both of Kaisei-machi, Japan

[73] Assignee: Fuji Photo Film Co., Ltd., Kanagawa, Japan

[21] Appl. No.: 462,774

[22] Filed: Jun. 5, 1995

Related U.S. Application Data

[62] Division of Ser. No. 835,113, Feb. 14, 1992, Pat. No. 5,458,811, which is a continuation of Ser. No. 607,860, Oct. 26, 1990, abandoned, which is a continuation of Ser. No. 383,240, Jul. 19, 1989, abandoned, which is a continuation of Ser. No. 76,988, Jul. 20, 1987, abandoned, which is a continuation of Ser. No. 814,028, Dec. 23, 1985, abandoned, which is a continuation of Ser. No. 668,464, Nov. 5, 1984, abandoned.

[30] Foreign Application Priority Data

Nov. 7, 1983 [JP] Japan .................................. 58-208727
Nov. 7, 1983 [JP] Japan .................................. 58-208728

[51] Int. Cl.⁶ .................................................. C09K 11/61
[52] U.S. Cl. .................................. 252/301.4 H; 250/484.4
[58] Field of Search .................. 252/301.4 H; 250/484.4

[56] References Cited

U.S. PATENT DOCUMENTS 4,076,897  2/1978  Joiner ........................ 252/301.4 H X
4,505,989  3/1985  Umemoto et al. ............... 252/301.4 H
4,535,237  8/1985  Takahashi et al. ............... 252/301.4 H

FOREIGN PATENT DOCUMENTS 21342   1/1981   European Pat. Off. ..
95741  12/1983   European Pat. Off. ..

*Primary Examiner*—Melissa Bonner
*Attorney, Agent, or Firm*—Sixbey, Friedman, Leedom & Ferguson

[57] ABSTRACT

A divalent europium activated complex halide phosphor having the formula (I):

$$M^{II}FX \cdot aM^{I}X' : xEu^{2+} \qquad (I)$$

in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leqq 4.0$ and $0 < x \leqq 0.2$, respectively. A process for the preparation of said phosphor, a radiation image recording and reproducing method utilizing said phosphor, and a radiation image storage panel employing said phosphor are also disclosed.

10 Claims, 9 Drawing Sheets

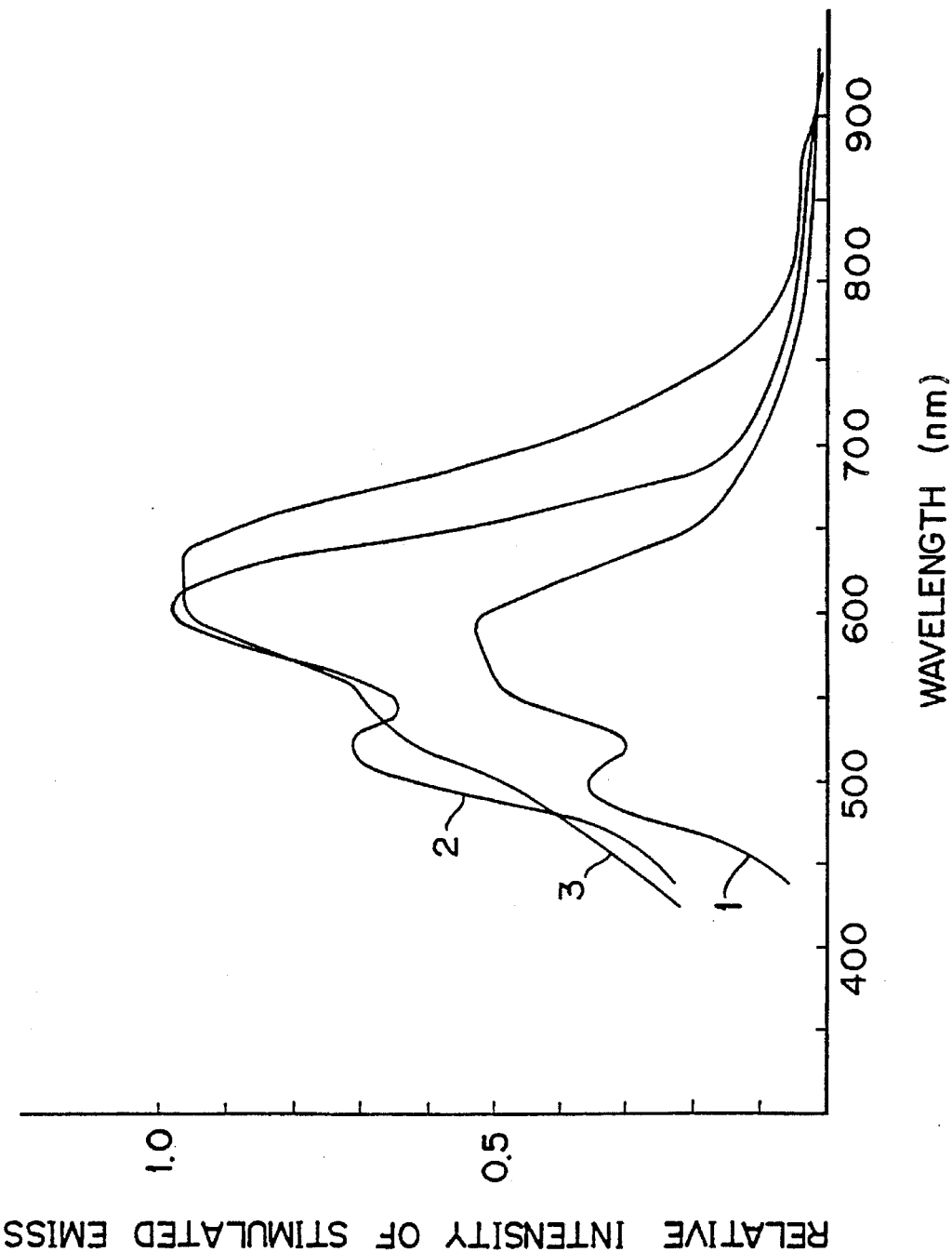

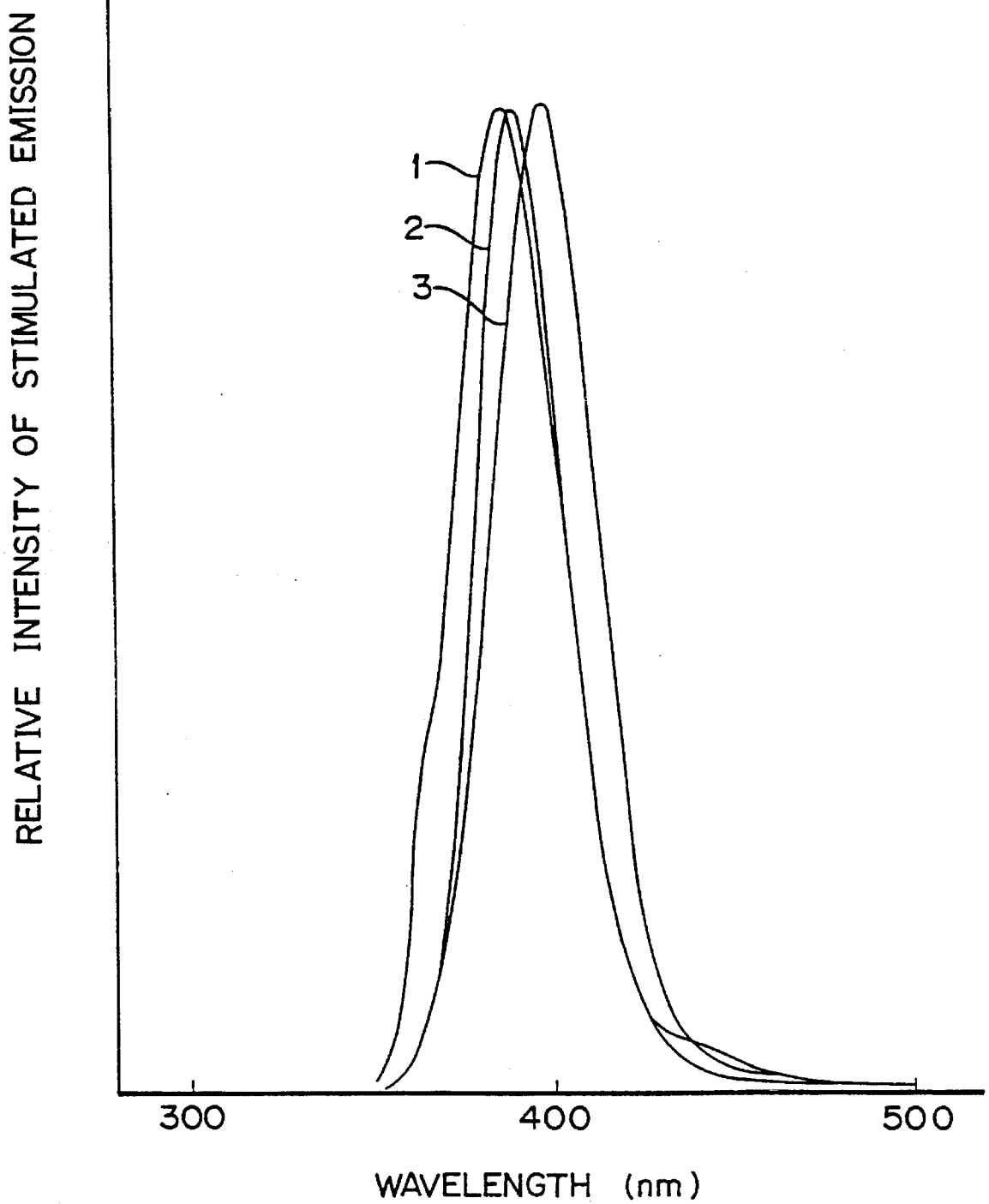

PHOSPHOR, RADIATION IMAGE RECORDING AND REPRODUCING METHOD AND RADIATION IMAGE STORAGE PANEL EMPLOYING THE SAME

This is a Divisional application of Ser. No. 07/835,113, filed Feb. 14, 1992, now U.S. Pat. No. 5,458,811, which was a continuation of Ser. No. 07/607,860, filed Oct. 26, 1990, now abandoned; which was a continuation of Ser. No. 07/383,240, filed Jul. 19, 1989, now abandoned; which was a continuation of Ser. No. 07/076,988, filed Jul. 20,1987, now abandoned; which was a continuation of Ser. No. 06/814,028, filed Dec. 23, 1985, now abandoned; which was a continuation of Ser. No. 06/668,464, filed Nov. 5, 1984, now abandoned.

BACKGROUND OF THE INVENTION

1. Field of the Invention

The present invention relates to a novel phosphor, a process for the preparation of the same, a radiation image recording and reproducing method utilizing the same, and a radiation image storage panel employing the same. More particularly, the invention relates to a novel divalent europium activated complex halide phosphor.

2. Description of the Prior Art

There is well known a divalent europium activated alkaline earth metal fluorohalide phosphor ($M^{II}FX:Eu^{2+}$, in which $M^{II}$ is at least one alkaline earth metal selected from the group consisting of Ba, Sr and Ca; and X is a halogen other than fluorine), as a divalent europium activated alkaline earth metal halide phosphor. For instance, Japanese Patent Publication No. 51(1976)-28591 discloses that the phosphor gives an emission (spontaneous emission) in the near ultraviolet region when excited with a radiation such as X-rays, cathode rays or ultraviolet rays, the maximum of the emission being at the wavelength of approx. 390 nm, and the phosphor is useful for a radiographic intensifying screen employable for radiography such as X-ray photography.

Recently, it has been discovered that the divalent europium activated alkaline earth metal fluorohalide phosphor emits light in the near ultraviolet region when excited with an electromagnetic wave such as visible light or infrared rays after exposure to a radiation such as X-rays, cathode rays and ultraviolet rays, that is, the phosphor gives stimulated emission, as disclosed in Japanese Patent Provisional Publication No. 55(1980)-12148. For this reason, the phosphor has been paid much attention as a phosphor for a radiation image storage panel employable in a radiation image recording and reproducing method utilizing a stimulable phosphor.

The radiation image recording and reproducing method can be employed in place of the conventional radiography utilizing a combination of a radiographic film having an emulsion layer containing a photosensitive silver salt and an intensifying screen as described, for instance, in U.S. Pat. No. 4,289,968. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, the radiation image recording and reproducing method is of great value, especially when the method is used for medical diagnosis.

As for a stimulable phosphor employable in the radiation image recording and reproducing method, a rare earth element activated alkaline earth metal fluorohalide phosphor such as the above-mentioned divalent europium activated alkaline earth metal fluorohalide phosphor is known, but almost no stimulable phosphor other than this phosphor is known.

SUMMARY OF THE INVENTION

The present invention provides a divalent europium activated complex halide phosphor which is different from the above-mentioned known divalent europium activated alkaline earth metal fluorohalide phosphor, and a process for the preparation of the same. The invention further provides a radiation image recording and reproducing method and a radiation image storage panel employing said phosphor.

Accordingly, a primary object of the present invention is to provide a novel divalent europium activated complex halide phosphor and a process for the preparation of the same.

Another object of the present invention is to provide a radiation image recording and reproducing method utilizing said novel stimulable phosphor and a radiation image storage panel employing the same.

As a result of study, the present inventors have found that a novel phosphor having a crystal structure different from that of the above-mentioned divalent europium activated alkaline earth metal fluorohalide phosphor can be obtained by procedures of mixing at least one compound selected from the alkali metal halide group consisting of fluorides, chlorides, bromides and iodides of Rb and Cs with a mixture of starting materials for the preparation of the divalent europium activated alkaline earth metal fluorohalide phosphor in an appropriate ratio; and firing the obtained mixture at a temperature within the range of 500°–1,300° C. in a weak reducing atmosphere.

The phosphor of the invention is a divalent europium activated complex halide phosphor having the formula (I):

$$M^{II}FX \cdot aM^{I}X' : xEu^{2+} \qquad (I)$$

in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leq 4.0$ and $0 < x \leq 0.2$, respectively.

The process for the preparation of the phosphor having the formula (I) of the invention comprises:

mixing starting materials for the phosphor in a stoichiometric ratio corresponding to the formula (II):

$$M^{II}FX \cdot aM^{I}X' : xEu \qquad (II)$$

in which $M^{II}$, $M^{I}$, X, X', a and x have the same meanings as defined above; and firing the obtained mixture at a temperature within the range of 500°–1,300° C. in a weak reducing atmosphere.

The divalent europium activated complex halide phosphor having the formula (I) of the present invention gives a stimulated emission in the near ultraviolet to blue region when excited with an electromagnetic wave having a wavelength within the range of 450–900 nm after exposure to a radiation such as X-rays, ultraviolet rays, cathode rays, γ-rays, α-rays or β-rays. Particularly, the phosphor having the formula (I) in which $M^I$ is Cs and a is a number satisfying the condition of $0<a\leq1.5$ gives a stimulated emission of higher luminance than that of the known divalent europium activated alkaline earth metal fluorohalide phosphor.

The phosphor having the formula (I) also gives a spontaneous emission in the near ultraviolet to blue region when excited with a radiation such as X-rays, ultraviolet rays or cathode rays.

On the basis of the stimulated emission characteristics of the novel phosphor as described above, the present inventors have further accomplished the following invention.

That is, the radiation image recording and reproducing method comprises steps of:

i) causing the divalent europium activated complex halide phosphor having the above formula (I) to absorb a radiation having passed through an object or having radiated from an object;

ii) exciting said stimulable phosphor with an electromagnetic wave having a wavelength within the range of 450–900 run to release the radiation energy stored therein as light emission; and iii) detecting the emitted light.

Especially, the method of the invention utilizing the phosphor having the formula (I) in which $M^I$ is Cs and a is a number satisfying the condition of $0<a\leq1.5$ gives higher sensitivity than that of the radiation image recording and reproducing method utilizing the known divalent europium activated alkaline earth metal fluorohalide phosphor.

The radiation image storage panel of the invention comprises a support and at least one phosphor layer provided thereon which comprises a binder and a stimulable phosphor dispersed therein, in which at least one phosphor layer contains the divalent europium activated complex halide phosphor having the above formula (I).

BRIEF DESCRIPTION OF THE DRAWINGS

FIG. 2 shows stimulation spectra of the BaFBr.CsCl:0.001Eu$^{2+}$ phosphor, BaFBr.CsBr:0.001Eu$^{2+}$ phosphor and BaFBr.CsI:0.001Eu$^{2+}$ phosphor (Curves 1, 2 and 3, respectively).

FIG. 3 shows stimulated emission spectra of the BaFBr.CsCl:0.001Eu$^{2+}$ phosphor, BaFBr.CsBr:0.001Eu$^{2+}$ phosphor and BaFBr.CsI:0.001Eu$^{2+}$ phosphor (Curves 1, 2 and 3, respectively).

DETAILED DESCRIPTION OF THE INVENTION

Figure 1A:
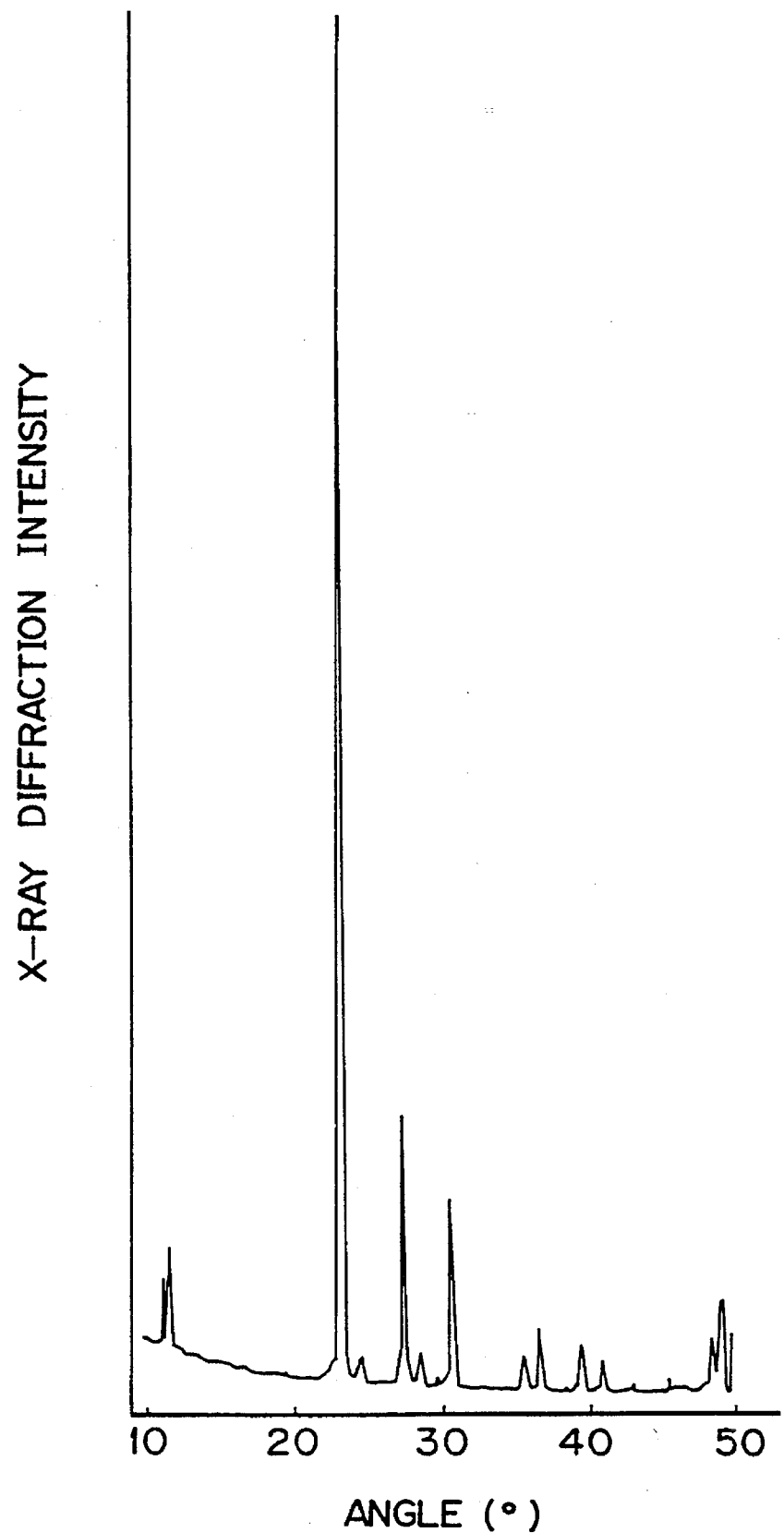
FIG. 1 shows X-ray diffraction patterns of a BaFBr.CsI:0.001Eu$^{2+}$ phosphor, a BaFBr.CsCl:0.001Eu$^{2+}$ phosphor and a BaFBr.CsBr:0.001Eu$^{2+}$ phosphor [(a), (b) and (c), respectively], which are examples of the divalent europium activated complex halide phosphor of the present invention, and X-ray diffraction patterns of the known BaFBr:0.001Eu$^{2+}$ phosphor and CsI [(d) and (e), respectively].
Figure 1B:
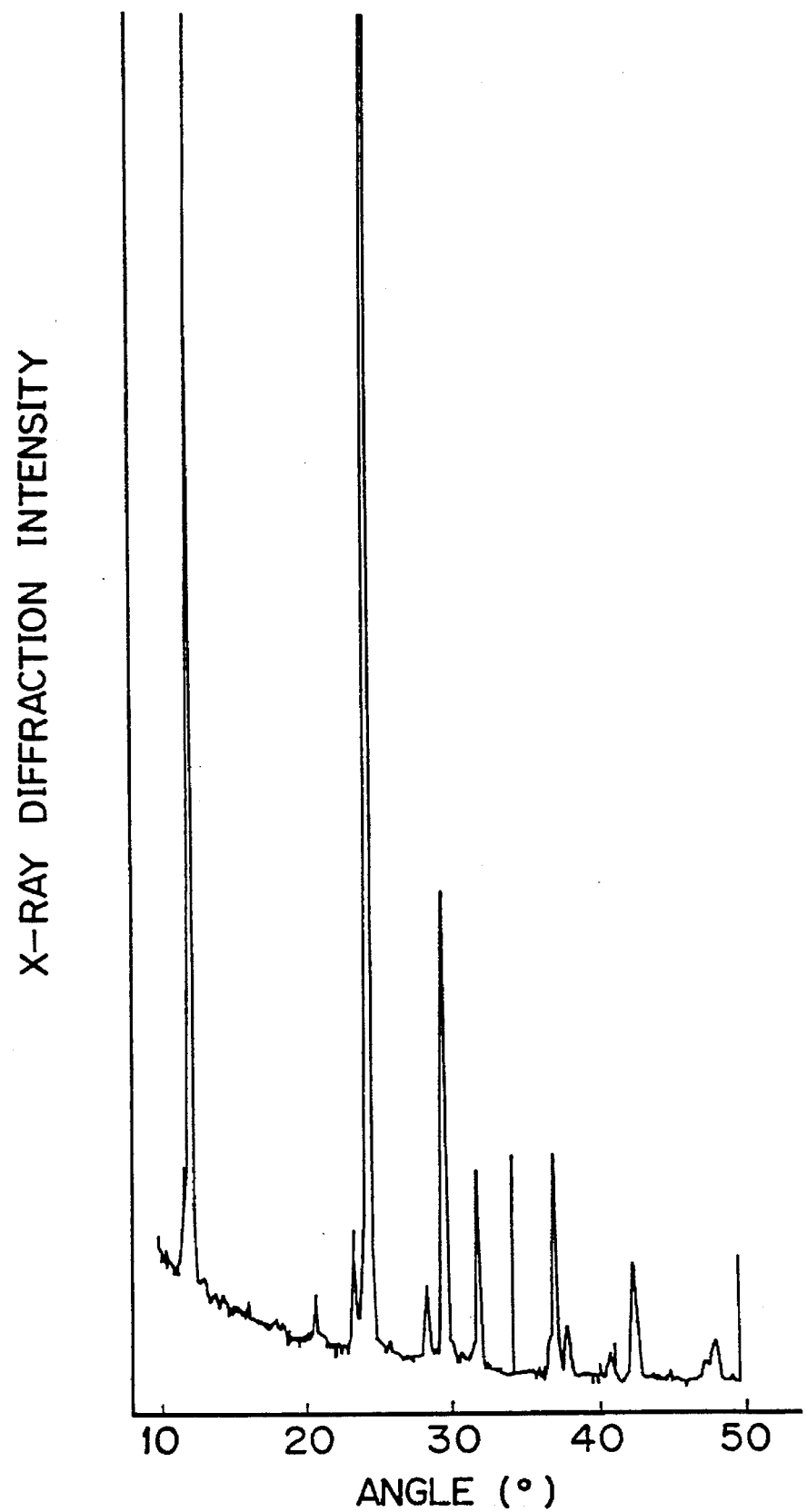
Figure 1C:
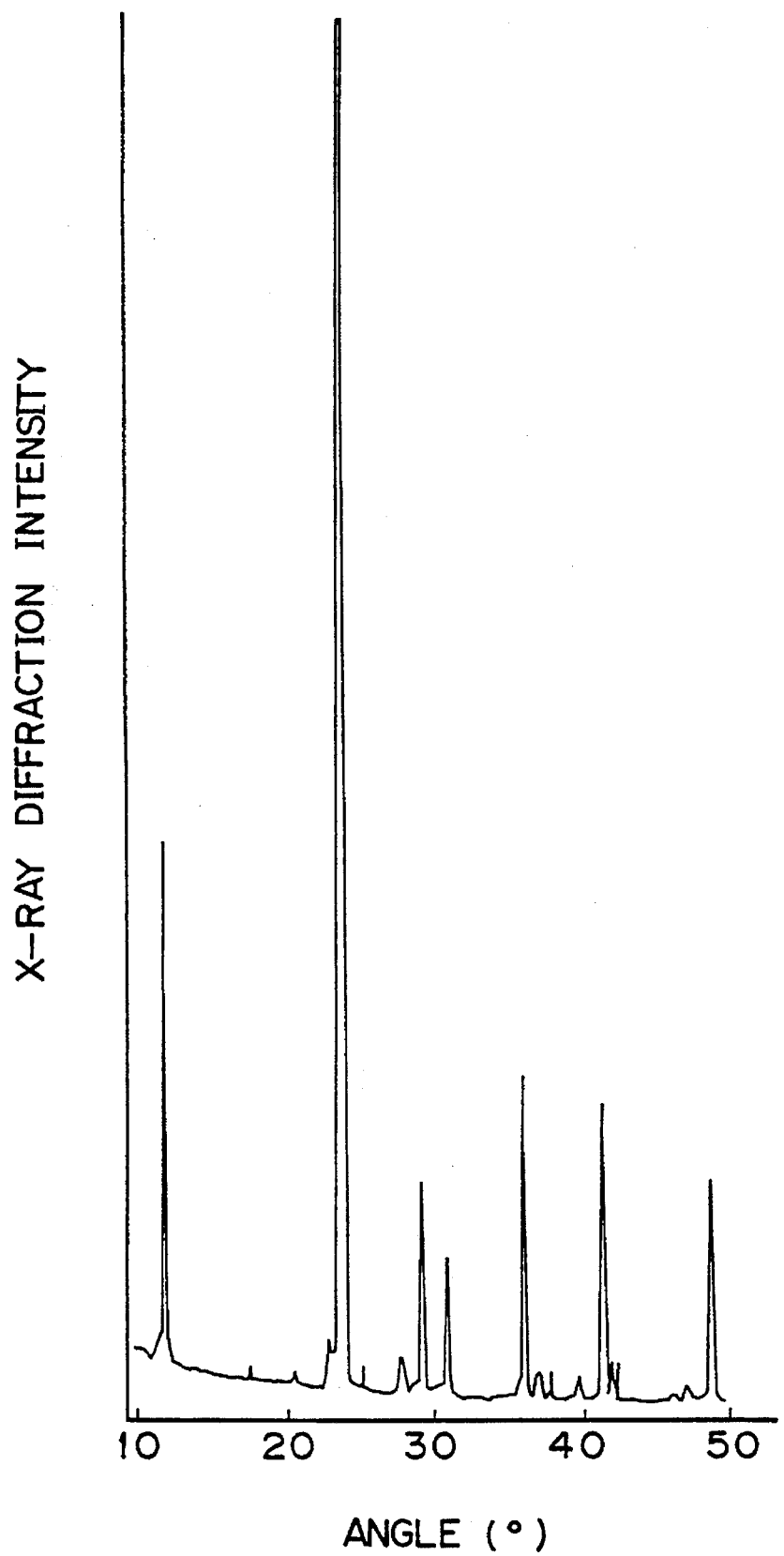

The divalent europium activated complex halide phosphor of the present invention can be prepared, for example, by a process described below.

As starting materials, the following materials can be employed:

(1) at least one alkaline earth metal fluoride selected from the group consisting of $BaF_2$, $SrF_2$ and $CaF_2$;

(2) at least one alkaline earth metal halide selected from the group consisting of $BaCl_2$, $SrCl_2$, $CaCl_2$, $BaBr_2$, $SrBr_2$, $CaBr_2$, $BaI_2$, $SrI_2$ and $CaI_2$ (3) at least one alkali metal halide selected from the group consisting of RbF, CsF, RbCl, CsCl, RbBr, CsBr, RbI and CsI; and (4) at least one compound selected from the group consisting of europium compounds such as europium halide, europium oxide, europium nitrate and europium sulfate.

Further, ammonium halide ($NH_4X''$, in which $X''$ is any one of Cl, Br and I) may be employed as a flux.

In the process for the preparation of the phosphor of the invention, the above-mentioned alkaline earth metal fluoride (1), alkaline earth metal halide (2), alkali metal halide (3) and europium compound (4) are, in the first place, mixed in the stoichiometric ratio corresponding to the formula (II):

$$M''FX.aM'X':xEu \qquad (II)$$

in which $M''$ is at least one alkaline earth metal selected from the group consisting of Ba, Sr and Ca; $M^I$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0<a\leq4.0$ and $0<x\leq0.2$, respectively.

From the viewpoint of the luminance of stimulated emission, $M^I$ in the formula (II) representing an alkali metal is preferably Cs, and the number a indicating the amount of the alkali metal is preferably within the range of $0<a\leq1.5$. From the same viewpoint, it is preferable that $M''$ in the formula (II) representing an alkaline earth metal is Ba, X representing halogen is Br, X' also representing halogen is at least one element selected from the group consisting of Br and I, and the number x indicating the amount of europium activator is within the range of $10^{-5}\leq x\leq 10^{-2}$.

The mixture of starting materials for the phosphor of the present invention is prepared by any one of the following procedures;

i ) simply mixing the starting materials (1) to (4);

ii ) mixing the starting materials (1) to (3), heating the obtained mixture at a temperature of not lower than 100° C. for several hours and then mixing the heat-treated mixture with the starting material (4); and iii ) mixing the starting materials (1) to (3) in the form of a suspension, drying the suspension by reduced pressure drying, vacuum drying or spray drying under heating (preferably, 50°–200° C.), and then mixing the obtained dry product with the starting material (4).

Further, as modifications of the above procedure ii), there may be mentioned a procedure comprising mixing the starting materials (1) to (4) and subjecting the obtained mixture to the heating treatment; and a procedure comprising mixing the starting materials (1), (2) and (4), subjecting the obtained mixture to the heating treatment and mixing the obtained heat-treated product with the starting material (3). As modifications of the procedure iii), there may be mentioned a procedure comprising mixing the starting materials (1) to (4) in the form of a suspension and subjecting the suspension to the drying; and a procedure comprising mixing the starting materials (1), (2) and (4) in the form of a suspension, drying the suspension, and mixing the obtained dry product with the starting material (3).

The mixing is carried out using a conventional mixing apparatus such as a variety of mixers, a V-type blender, a ball mill and a rod mill in any case of the above-described procedures i), ii) and iii).

Then, the resulting mixture of the starting materials is placed in a heat-resistant container such as a quartz boat, an alumina crucible or a quartz crucible, and fired in an electric furnace. The temperature for the firing suitably ranges from 500° to 1,300° C., and preferably ranges from 700° to 1,000° C. The firing period is determined depending upon the amount of the mixture of starting materials, the firing temperature, etc., and suitably ranges from 0.5 to 6 hours. As the firing atmosphere, there can be employed a weak reducing atmosphere such as a nitrogen gas atmosphere containing a small amount of hydrogen gas or a carbon dioxide gas atmosphere containing carbon monoxide gas. A trivalent europium compound is generally employed as the abovementioned starting material (4) and in the firing stage, the trivalent europium contained in the mixture is reduced into divalent europium by the weak reducing atmosphere.

Through the firing procedure, a powdery phosphor of the present invention is produced. The powdery phosphor thus obtained may be processed in a conventional manner involving a variety of procedures for the preparation of phosphors such as a washing procedure, a drying procedure and a sieving procedure.

The phosphor of the present invention prepared in accordance with the above-described process is a divalent europium activated complex halide phosphor having the formula (I):

$$M''FX.aM'X':xEu^{2+} \qquad (I)$$

in which $M''$ is at least one alkaline earth metal selected from the group consisting of Ba, Sr and Ca; $M'$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0<a\leq4.0$ and $0<x\leq0.2$, respectively.

Figure 1:
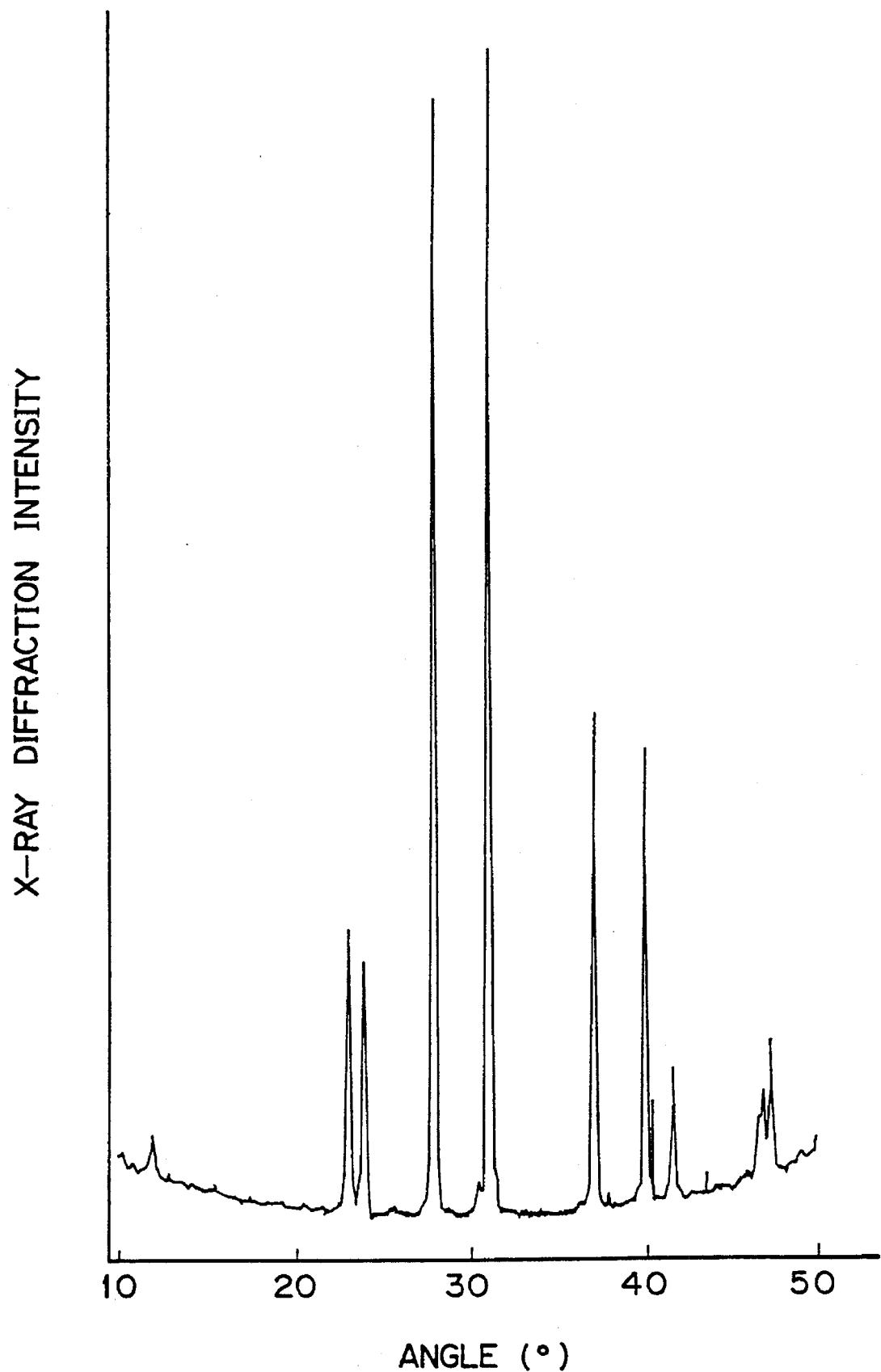
Figure 1E:
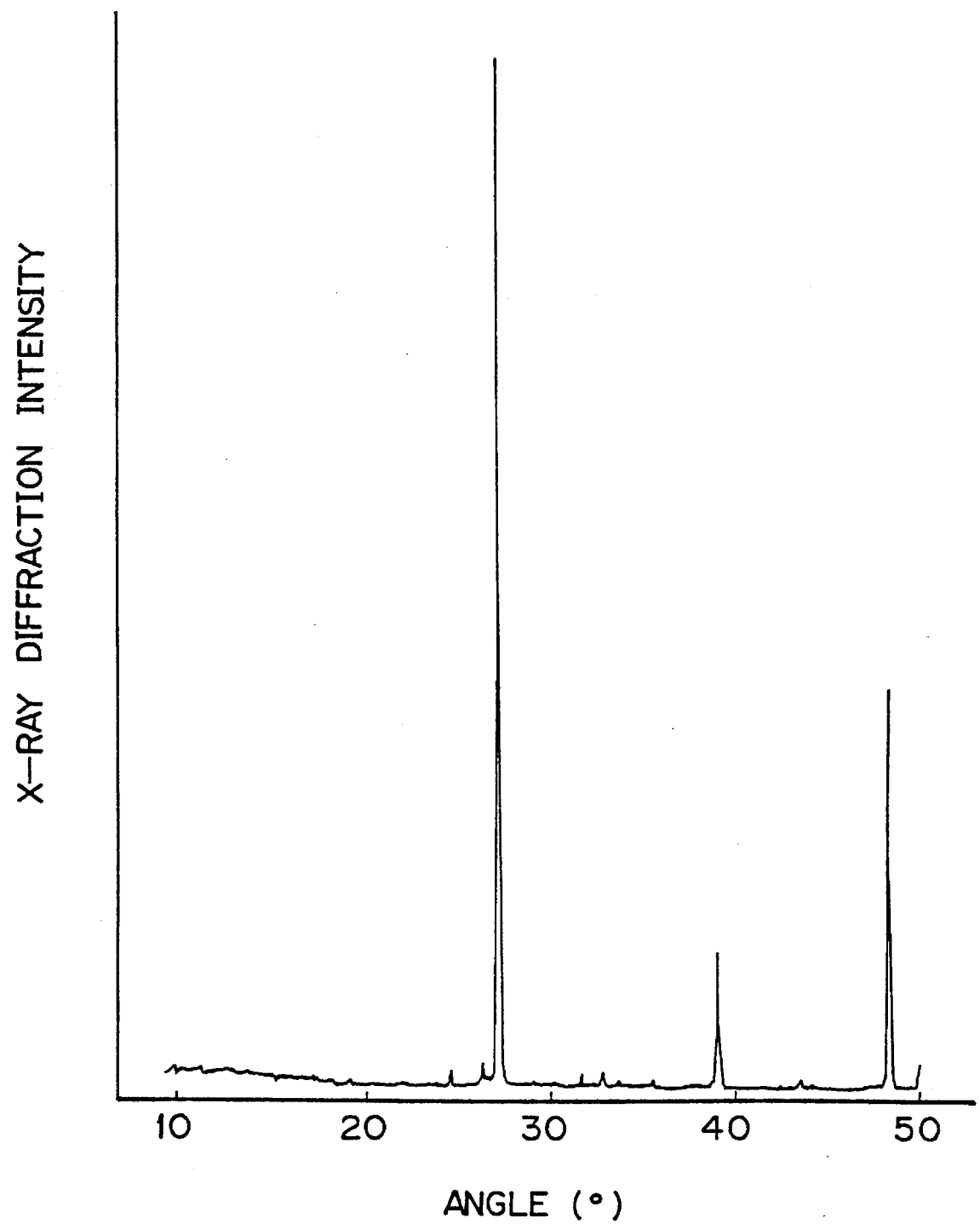

FIGS. 1-(a), 1-(b) and 1-(c) show X-ray diffraction patterns of a BaFBr.CsI :Eu$^{2+}$ phosphor, a BaFBr.CsCl :Eu$^{2+}$ phosphor and a BaFBr.CsBr:Eu$^{2+}$ phosphor, respectively, which are examples of the phosphor prepared by the process of the present invention. FIGS. 1-(d) and 1-(e) show X-ray diffraction patterns for comparison, of a known BaFBr:Eu$^{2+}$ phosphor and CsI, respectively. These X-ray diffraction patterns were measured using Cu,K$\alpha_1$ radiation.

As is clear from FIGS. 1-(a), 1-(b) and 1-(c), the crystal structures of the three phosphors according to the present invention, each phosphor having a different X' in the formula (I), are similar to each other. By comparison among FIGS. 1-(a), 1-(b), 1-(c) and 1-(d), it is clear that the crystal structures of the phosphors of the invention are quite different from that of the known BaFBr:Eu$^{2+}$ phosphor, although the phosphor of the invention consists of the known BaFBr:Eu$^{2+}$ phosphor and CsX' as far as the composition is concerned. By comparison between FIGS. 1-(a) and 1-(e), it is clear that the crystal structure of the BaFBr.CsI:Eu$^{2+}$ phosphor of the invention is quite different from that of CsI. The crystal structures of CsCl and CsBr are similar to that of CsI, and accordingly, the crystal structures of BaFBr·CsCl:Eu$^{2+}$ phosphor and BaFBr.CsBr:Eu$^{2+}$ phosphor of the invention are also quite different from those of CsCl and CsBr, respectively.

It has been confirmed that the peak positions of X-ray diffraction patterns shown in FIGS. 1-(a), 1-(b) and 1-(c), each of which corresponds to the phosphor having a value (indicating the amount of CsX') of 1, continuously shift with the variation of the a value. However, even when each a value in the phosphors reaches close to 0, the characteristic peaks for the known BaFBr:Eu$^{2+}$ phosphor never appear in the X-ray diffraction patterns thereof. Accordingly, it can be mentioned that the crystal structures of said phosphors according to the present invention are different from that of the known BaFBr:Eu$^{2+}$ phosphor.

The crystal structure of the divalent europium acitivated complex halide phosphor of the present invention is described hereinabove referring to the BaFBr.CsI:Eu$^{2+}$ phosphor, BaFBr.CsCl:Eu$^{2+}$ phosphor and BaFBr.CsBr:Eu$^{2+}$ phosphor. It has been further confirmed that the crystal structures of other phosphors according to the present invention are almost the same as described above.

The divalent europium activated complex halide phosphor of the present invention gives stimulated emission in the near ultraviolet to blue region when excited with an electromagnetic wave having a wavelength within the region of 450–900 nm such as visible light or infrared rays after exposure to a radiation such as X-rays, ultraviolet rays and cathode rays.

FIGS. 2 shows examples of stimulation spectra of the divalent europium activated complex halide phosphors according to the present invention:

Curve 1: stimulation spectrum of BaFBr.CsCl:Eu$^{2+}$ phosphor;

Curve 2: stimulation spectrum of BaFBr.CsBr:Eu$^{2+}$ phosphor; and

Curve 3: stimulation spectrum of BaFBr.CsI:Eu$^{2+}$ phosphor.

As is clear from FIG. 2, the phosphors according to the present invention give stimulated emission upon excitation with an electromagnetic wave in the wavelength region of 450–900 nm after exposure to a radiation, and particularly the intensity of the stimulated emission is high in the wavelength region of not longer than 800 nm. As is also clear from FIG. 2, the maximum peaks of the stimulation spectra of the phosphors according to the present invention are located on the longer wavelength side in such an order of X' in CsX' constituting the phosphor as Cl (Curve 1), Br (Curve 2), and I (Curve 3). Based on this fact, the wavelength region (i.e., 450–900 nm) of an electromagnetic wave employed as stimulating rays has been decided in the radiation image recording and reproducing method of the invention.

FIG. 3 shows examples of stimulated emission spectra of the divalent europium activated complex halide phosphors according to the present invention:

Curve 1: stimulated emission spectrum of BaFBr.CsCl:Eu$^{2+}$ phosphor;

Curve 2: stimulated emission spectrum of BaFBr.CsBr:Eu$^{2+}$ phosphor; and

Curve 3: stimulated emission spectrum of BaFBr.CsI:Eu$^{2+}$ phosphor.

As is clear from FIG. 3, the phosphors according to the invention give stimulated emission in the near ultraviolet to blue region, and each peak wavelength of the emission spectra is within the region of approx. 390–400 nm. Accordingly, in the case that the phosphor of the present invention is excited with an electromagnetic wave within the wavelength region of approx. 500–800 nm after exposure to a radiation, the emitted light can be easily separated from the stimulating rays, and the phosphor exhibits stimulated emission of high intensity. As is also clear from FIG. 3, the maximum peaks of the stimulated emission spectra of the phosphors according to the present invention are located on the longer wavelength side in the same order as that of the peaks of the above-mentioned stimulation spectra.

The stimulation spectra and stimulated emission spectra of the divalent europium activated complex halide phosphors according to the present invention are illustrated hereinbefore, for the BaFBr.CsCl:Eu$^{2+}$ phosphor, BaFBr.CsBr:Eu$^{2+}$ phosphor and BaFBr.CsI:Eu$^{2+}$ phosphor. It has been confirmed that other phosphors according to the invention show almost the same stimulation spectra and stimulated emission spectra as those of the above-mentioned phosphors. Thus, they have the similar stimulated emission characteristics to the above-mentioned phosphors.

The divalent europium activated complex halide phosphor of the present invention also gives spontaneous emission in the near ultraviolet to blue region upon excitation with a radiation such as X-rays, ultraviolet rays and cathode rays, and the spontaneous emission spectrum of the phosphor is almost the same as the stimulated emission spectrum thereof.

Figure 4:
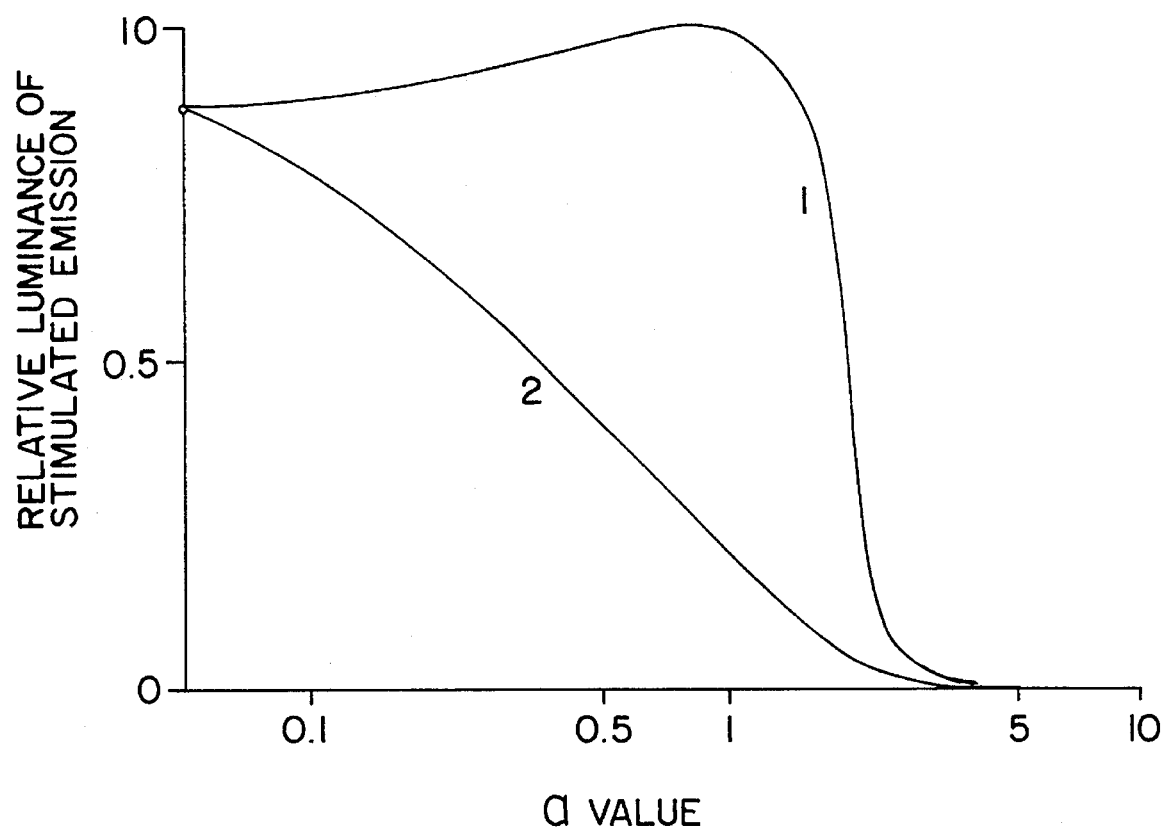
FIG. 4 shows relationships between a value and a luminance of stimulated emission upon excitation at 682.8 nm with respect to BaFBr.aM$^I$I:0.001Eu$^{2+}$ phosphors of the present invention, in which Curves 1 and 2 correspond to a BaFBr.aCsI:0.001Eu$^{2+}$ phosphor and a BaFBr.aRbI:0.001Eu$^{2+}$ phosphor, respectively.

FIG. 4 graphically shows a relationship between a value and a luminance of stimulated emission [emission luminance upon excitation with a He—Ne laser beam (wavelength: 632.8 nm) after exposure to X-rays at 80 KVp with respect to BaFBr.aM':Eu$^{2+}$ phosphor of the present invention, in which Curve 1 indicates a relationship therebetween with respect to a BaFBr.aCsI:Eu$^{2+}$ phosphor and Curve 2 indicates with respect to a BaFBr.aRbI:Eu$^{2+}$ phosphor. In FIG. 4, the intersection point of the above-mentioned curves and vertical axis indicates the emission luminance of the phosphor in which a=0, that is, the known BaFBr:Eu$^{2+}$ phosphor.

As is evident from FIG. 4, with respect to the BaFBr.aCsI:Eu$^{2+}$ phosphor (Curve 1), the luminance of stimulated emission increases in the range of 0<a<1.0 as the a value increases, having the maximum at approx. a=1.0, while steeply decreases in the range of 1.0<a and it reaches an unmeasurably low level when the a value is larger than 4.0. Especially in the range of 0<a≦1.5, the BaFBr.aCsI:Eu$^{2+}$ phosphor exhibits stimulated emission of higher luminance than that of the known BaFBr:Eu$^{2+}$ phosphor. It has been confirmed that the phosphors in which M'=Cs according to the invention other than the BaFBr.aCsI:Eu$^{2+}$ phosphor have the same tendencies in the relationship between the a value and the luminance of stimulated emission as illustrated by Curve 1 of FIG. 4.

On the other hand, with respect to the BaFBr.aRbI:$^{2+}$ phosphor (Curve 2), the luminance of stimulated emission decreases linearly as the a value increases, and it reaches an unmeasurably low level when the a value is larger than 4.0.

It has been confirmed that the phosphors in which M'=Rb according to the invention other than the BaFBr.aRbI:Eu$^{2+}$ phosphor have the same tendencies in the relationship between the a value and the luminance of stimulated emission as illustrated by Curve 2 of FIG. 4.

On the basis of these facts, the a value range (i.e., 0<a≦4.0) of the divalent europium activated alkaline earth metal complex halide of the invention has been determined.

From the viewpoint of emission properties described above, the phosphor of the invention is very useful as a phosphor for the use in a radiation image storage panel employed in the radiation image recording and reproducing method or for a radiographic intensifying screen employed in the conventional radiography, both panel and screen being used in the medical radiography such as X-ray photography for medical diagnosis and in the industrial radiography for non-destructive inspection.

Particularly in the case of employing the phosphor of the invention in the radiation image recording and reproducing method, it is possible to vary the wavelength of stimulating rays for exciting the phosphor because of the wide wavelength region of its stimulation spectrum, namely 450–900 nm. It means that a source of stimulating rays can be suitably selected according to the purpose. For example, a semiconductor laser (having a wavelength in the infrared region) which is in a small size and needs only weak driving power can be employed as the source of stimulating rays, and accordingly the system for performing the method can be made compact. From the viewpoint of the luminance of stimulated emission and of the separation on wavelength between the emitted light and stimulating rays, the stimulating rays are preferred to be an electromagnetic wave having a wavelength within the range of 500–800 nm.

The divalent europium activated complex halide phosphor having the formula (I), which has the aforementioned crystal structure and emission characteristics, is preferably employed in the form of a radiation image storage panel (also referred as a stimulable phosphor sheet) in the radiation image recording and reproducing method of the invention. The radiation image storage panel comprises a support and at least one phosphor layer provided on one surface of the support. The phosphor layer comprises a binder and a stimulable phosphor dispersed therein. Further, a transparent protective film is generally provided on the free surface of the phosphor layer (surface not facing the support) to keep the phosphor layer from chemical deterioration or physical shock.

In the radiation image recording and reproducing method employing the stimulable phosphor having the formula (I) in the form of a radiation image storage panel, a radiation having passed through an object or radiated from an object is absorbed by the phosphor layer of the panel to form a radiation image as a radiation energy-stored image on the panel. The panel is then excited (e.g., scanned) with an electromagnetic wave in the wavelength region of 450–900 nm to release the stored image as stimulated emission. The emitted light is photoelectrically detected to obtain electric signals so that the radiation image of the object can be reproduced as a visible image from the obtained electric signals.

The radiation image recording and reproducing method of the present invention will be described in more detail with respect to an example of a radiation image storage panel containing the stimulable phosphor having the formula (I), by referring to a schematic view shown in FIG. 5.

Figure 5:
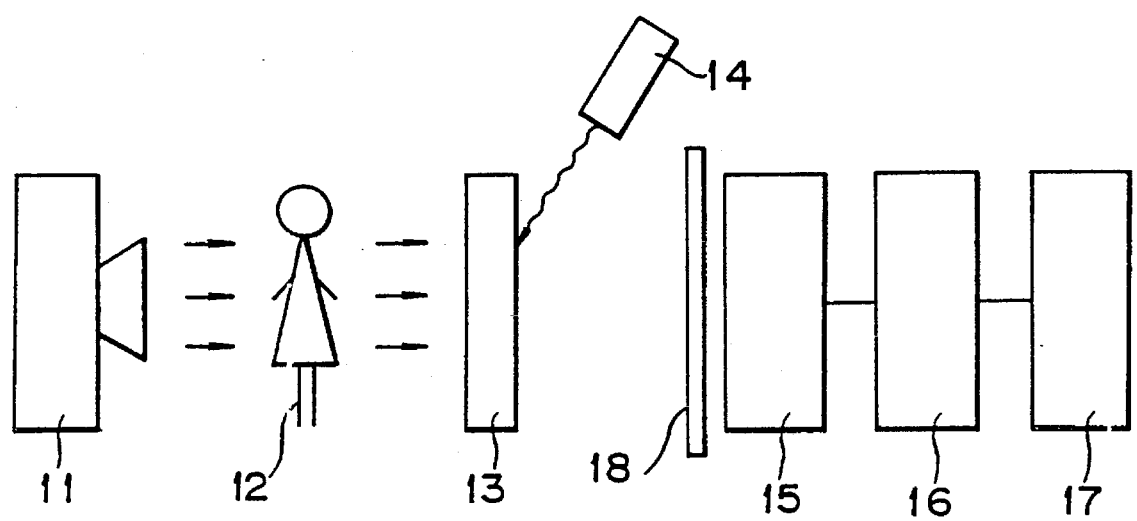
FIG. 5 is a schematic view showing the radiation image recording and reproducing method according to the present invention.

In FIG. 5 which shows the total system of the radiation image recording and reproducing method of the invention, a radiation generating device 11 such as an X-ray source provides a radiation for irradiating an object 12 therewith; a radiation image storage panel 13 containing the stimulable phosphor having the formula (I) absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the light emitted by the panel 13 to pass through.

FIG. 5 illustrates an example of the system according to the method of the invention employed for obtaining a radiation-transmission image of an object. However, in the case that the object 12 itself emits a radiation, it is unnecessary to install the above-mentioned radiation generating device 11. Further, the devices 15 through 17 in the system can be replaced with other appropriate devices which can reproduce a radiation image having the information of the object 12 from the light emitted by the panel 13.

Referring to FIG. 5, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the radiation-transmission image of the object 12 is formed on the panel 13.

Thereafter, when the radiation image storage panel 13 is irradiated with an electromagnetic wave having the wavelength within the range of 450–900 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The detection of the radiation image stored in the panel 13 can be, for example, carried out by scanning the panel 13 with the electromagnetic wave provided by the source of stimulating rays 14 and detecting the light emitted from the panel 13 under scanning by means of the photosensor 15 to sequentially obtain the electric signals.

In the radiation image recording and reproducing method of the present invention, there is no specific limitation on the radiation employable for exposure of an object to obtain a radiation transmittance image thereof, as far as the above-described phosphor gives stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to serve as an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 450–900 nm; and light sources providing light having a single wavelength or more in said region such as an Ar ion laser, a Kr ion laser, a He—Ne laser, a ruby laser, a semiconductor laser, a glass laser, a YAG laser, a dye laser and a light emitting diode. Among the above-mentioned sources of stimulating rays, the lasers are preferred because the radiation image storage panel is exposed thereto with a high energy density per unit area. Particularly preferred are a He—Ne laser and an Ar ion laser. The semiconductor laser is also preferred, because its size is small, it can be driven by a weak electric power and its output power can be easily stabilized because of the direct modulation thereof.

The radiation image storage panel employable in the radiation image recording and reproducing method of the invention will be described.

The radiation image storage panel, as described hereinbefore, comprises a support and at least one phosphor layer provided thereon which comprises a binder and the above-described divalent europium activated complex halide phosphor having the formula (I) dispersed therein.

The radiation image storage panel having such structure can be prepared, for instance, in the manner described below.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth) acrylate.

The phosphor layer can be formed on a support, for instance, by the following procedure.

In the first place, the stimulable phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder: phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitive type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided.

As described in U.S. patent application Ser. No. 496,278 (the whole content of which is described in European Patent Publication No. 92241), the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of radiation image, and the constitution of those protruded and depressed portions can be selected depending on the purpose of the radiation image storage panel.

After applying the coating dispersion to the support as described above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 µm to 1 mm, preferably from 50 to 500 µm.

The phosphor layer can be provided on the support by the methods other than that given as above. For example, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed, at least one layer contains the aforementioned divalent europium activated complex halide phosphor having the formula (I), and the plural layers may be placed in such a manner that a layer nearer to the surface shows stimulated emission of higher intensity. In any case, that is, in either the single phosphor layer or plural phosphor layers, a variety of known stimulable phosphors are employable in combination with the above-mentioned stimulable phosphor.

Examples of the stimulable phosphor employable in combination with the aforementioned stimulable phosphor in the radiation image storage panel of the present invention include the aforementioned $M''FX:Eu^{2+}$ phosphor and the phosphors described below;

ZnS: Cu,Pb, $BaO.xAl_2O_3$:Eu, in which x is a number satisfying the condition of $0.8 \leq x \leq 10$, and $M''O.xSiO_2$:A, in which $M''$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

$(Ba_{1-x-y}, Mg_x, Ca_y)FX:aEu^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$ as described in Japanese Patent Provisional Publication No. 55(1980)-12143; and LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078.

A radiation image storage panel generally has a transparent film on a free surface of a phosphor layer to physically and chemically protect the phosphor layer. In the panel of the present invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 μm.

The present invention will be illustrated by the following examples, but these examples by no means restrict the invention.

EXAMPLE 1

175.3 g. of barium fluoride ($BaF_2$), 333.2 g. of barium bromide ($BaBr_2.2H_2O$), 519.6 g. of Cesium iodide (CsI) and 0.783 g. of europium bromide ($EuBr_3$) were well mixed in a ball mill to obtain a mixture of the starting materials for the preparation of a phosphor.

The mixture thus obtained was placed in an alumina crucible, which was, in turn, placed in a high-temperature electric furnace. The mixture was then fired at 900° C. for 1.5 hours under a carbon dioxide atmosphere containing carbon monoxide. After the firing was complete, the crucible was taken out of the furnace and allowed to stand for cooling. Thus, a powdery divalent europium activated complex halide phosphor (BaFBr.CsI: $0.001Eu^{2+}$) was obtained.

The phosphor prepared in Example 1 was subjected to the X-ray diffraction measurement to obtain an X-ray diffraction pattern shown in FIG. 1-(a). The X-ray diffraction pattern is different from that of the known BaFBr:$0.001Eu^{2+}$ phosphor and that of CsI which is a starting material for the phosphor [FIGS. 1-(d) and 1-(e), respectively].

EXAMPLE 2

The procedure of Example 1 was repeated except for using 336.8 g. of cesium chloride (CsCl) instead of cesium iodide, to obtain a powdery divalent europium activated complex halide phosphor (BaFBr.CsCl:$0.001Eu^{2+}$).

The phosphor prepared in Example 2 was subjected to the X-ray diffraction measurement to obtain an X-ray diffraction pattern shown in FIG. 1-(b). The X-ray diffraction pattern is different from that of the known BaFBr:$0.001Eu^{2+}$ phosphor [FIG. 1-(d)] and that of CsCl which is a starting material for the phosphor.

EXAMPLE 3

The procedure of Example 1 was repeated except for using 425.6 g. of cesium bromide (CsBr) instead of cesium iodide, to obtain a powdery divalent europium activated complex halide phosphor (BaFBr.CsBr:$0.001Eu^{2+}$).

The phosphor prepared in Example 3 was subjected to the X-ray diffraction measurement to obtain an X-ray diffraction pattern shown in FIG. 1-(c). The X-ray diffraction pattern is different from that of the known BaFBr:$0.001Eu^{2+}$ phosphor [FIG. 1-(d)] and that of CsBr which is a starting material for the phosphor.

The phosphors prepared in Examples 1 through 3 were excited with a He—Ne laser (oscillation wavelength: 682.8 nm) after exposure to X-rays at 80 KVp, to measure stimulated emission spectra. The results are shown in FIG. 3.

In FIG. 3, Curves 1 to 3 correspond to the following spectra:

1: stimulated emission spectrum of BaFBr.CsCl: $0.001Eu^{2+}$ phosphor (Example 2);

2: stimulated emission spectrum of BaFBr.CsBr: $0.001Eu^{2+}$ phosphor (Example 3); and 3: stimulated emission spectrum of BaFBr.CsI: $0.001Eu^{2+}$ phosphor (Example 1).

The phosphors prepared in Examples 1 through 3 were excited with light whose wavelength was varied in the range of 450–1000 nm after exposure to X-rays at 80 KVp, to measure stimulation spectra at each peak wavelength of stimulated emission thereof. The results are shown in FIG. 2.

In FIG. 2, Curves 1 to 3 correspond to the following spectra:

1: stimulation spectrum of BaFBr.CsCl:$0.001Eu^{2+}$ phosphor (Example 2);

2: stimulation spectrum of BaFBr.CsBr:$0.001Eu^{2+}$ phosphor (Example 3); and

3: stimulation spectrum of BaFBr.CsI:$0.001Eu^{2+}$ phosphor (Example 1).

EXAMPLE 4

Radiation image storage panels were prepared using the three kinds of phosphors prepared in Examples 1 through 3, in the following manner.

To a mixture of the phosphor particles and a linear polyester resin were added successively methyl ethyl ketone and nitrocellulose (nitrification degree: 11.5 %), to prepare a dispersion containing the phosphor and the binder (10:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25–35 PS (at 25° C.).

The coating dispersion was applied to a polyethylene terephthalate sheet containing titanium dioxide (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

The radiation image storage panels prepared in Example 4 were measured on the sensitivity (i.e., luminance of stimulated emission) when excited with a He—Ne laser beam after exposure to X-rays at 80 KVp.

The results on the evaluation of the panels are set forth in Table 1, in which the result on a radiation image storage panel prepared in the same manner as Example 4 except for employing the known BaFBr:$0.001Eu^{2+}$ phosphor, being given under the same conditions, is also set forth for comparison.

TABLE 1

| | Relative Sensitivity |
|---|---|
| Panel employing BaFBr.CsI:$0.001Eu^{2+}$ phosphor (Example 1) | 115 |
| Panel employing BaFBr.CsCl:$0.001Eu^{2+}$ phosphor (Example 2) | 105 |

TABLE 1-continued

| | Relative Sensitivity |
|---|---|
| Panel employing BaFBr.CsBr:0.001Eu$^{2+}$ phosphor (Example 3) | 110 |
| Panel employing BaFBr:0.001Eu$^{2+}$ phosphor | 100 |

We claim:

1. A radiation image recording and reproducing method comprising steps of:
   i) causing a divalent europium activated complex halide phosphor having the formula (I):

$$M''FX \cdot aM'X' : xEu^{2+} \qquad (I)$$

in which $M''$ is at least one alkaline earth metal selected from the group consisting of Ba, Sr and Ca; $M'$ is Cs; X is at least one halogen selected from the group consisting of Cl, Br and I, X' is at least one halogen selected from the group consisting of F, Cl, Br and I; and a and x are numbers satisfying the conditions of $0 < a \leq 4.0$ and $0 \leq x \leq 0.2$, respectively, to absorb a radiation having passed through an object or having radiated from an object;
   ii) exciting said stimulable phosphor with an electromagnetic wave having a wavelength within the range of 450–900 nm to release the radiation energy stored therein as light emission; and
   iii) detecting the emitted light.

2. The radiation image recording and reproducing method as claimed in claim 1, in which a in the formula (I) is a number satisfying the condition of $0 < a \leq 1.5$.

3. The radiation image recording and reproducing method as claimed in claim 2, in which a in the formula (I) is 1.

4. The radiation image recording and reproducing method as claimed in claim 1, in which X in the formula (I) is Br.

5. The radiation image recording and reproducing method as claimed in claim 1, in which X' in the formula (I) is at least one halogen selected from the group consisting of Br and I.

6. The radiation image recording and reproducing method as claimed in claim 1, in which $M''$ in the formula (I) is Ba.

7. The radiation image recording and reproducing method as claimed in claim 1, in which x in the formula (I) is a number satisfying the condition of $10^{-5} \leq x \leq 10^{-2}$.

8. The radiation image recording and reproducing method as claimed in claim 1, in which said electromagnetic wave is one having a wavelength within the range of 500–800 nm.

9. The radiation image recording and reproducing method as claimed in claim 1, in which said electromagnetic wave is a laser beam.

10. A radiation image recording and reproducing method comprising steps of:
    i) causing a divalent europium activated complex halide phosphor having the formula (I):

$$M''FX \cdot aM'X' : xEu^{2+} \qquad (I)$$

in which $M''$ is at least one alkaline earth metal selected from the group consisting of Ba, Sr and Ca; $M^1$ is at least one alkali metal selected from the group consisting of Rb and Cs; X is at least one halogen selected from the group consisting of Cl, Br and I, X' is at least one halogen selected from the group consisting of F, Cl, Br and I; and a and x are numbers satisfying the conditions of $a=1$ and $0 < x \leq 0.2$, respectively, to absorb a radiation having passed through an object or having radiated from an object;
    ii) exciting said stimulable phosphor with an electromagnetic wave having a wavelength within the range of 450–900 nm to release the radiation energy stored therein as light emission; and
    iii) detecting the emitted light.

* * * * *